United States Patent
Baiera et al.

[11] Patent Number: 5,806,465
[45] Date of Patent: Sep. 15, 1998

[54] PET TOY

[75] Inventors: Vincent A. Baiera, Brooklyn, N.Y.; Jonathan Willinger, Tenafly, N.J.

[73] Assignee: J.W. Pet Company, Inc., Englewood, N.J.

[21] Appl. No.: 832,448

[22] Filed: Apr. 3, 1997

[51] Int. Cl.$^6$ ................................................ A01K 29/00
[52] U.S. Cl. .................. 119/707; 273/369; 473/429; 473/427
[58] Field of Search .................... 119/707, 708, 119/703, 704; 273/369; 473/423, 429, 436, 427, 160, 213

[56] References Cited

U.S. PATENT DOCUMENTS

| | | | |
|---|---|---|---|
| 1,862,044 | 6/1932 | White | 473/429 |
| 2,833,244 | 5/1958 | Bohlman | 119/707 |
| 3,408,070 | 10/1968 | Gonzales et al. | 473/427 |
| 3,665,892 | 5/1972 | Kusisto | 119/707 |
| 4,616,834 | 10/1986 | Davis | 473/429 |
| 4,930,448 | 6/1990 | Robinson . | |
| 5,103,770 | 4/1992 | Berkovich | 119/708 |
| 5,119,001 | 6/1992 | Moore et al. | 119/708 |
| 5,148,769 | 9/1992 | Zelinger | 119/707 |
| 5,322,036 | 6/1994 | Merino | 119/707 |
| 5,339,770 | 8/1994 | Haffner | 119/708 |
| 5,579,725 | 12/1996 | Boshears | 119/707 |
| 5,634,436 | 6/1997 | Coombs et al. | 119/707 |

FOREIGN PATENT DOCUMENTS

| | | | |
|---|---|---|---|
| 4007676 | 9/1991 | Germany | 119/708 |
| 7811302 | 5/1980 | Netherlands | 473/213 |

*Primary Examiner*—Todd E. Manahan
*Assistant Examiner*—Eduardo C. Robert
*Attorney, Agent, or Firm*—Helfgott & Karas, P.C.

[57] ABSTRACT

An elongated arm is rotatably connected to a pivot shaft mounted between a base and a canopy. The elongated arm extends radially between the canopy and the base and extends beyond the perimeter of the base and the canopy. Attached to the free end of the arm and suspended just beyond the perimeter of the canopy and the base is a toy character. In use, as a pet swats the toy character, the arm is rotated about the pivot shaft which initiate a fixed orbital motion of the character about the perimeter of the cap and the base.

21 Claims, 4 Drawing Sheets

PET TOY

BACKGROUND OF THE INVENTION

1. Field of the Invention

The present invention relates in general to a pet amusement and exercise device and in particular to a device having a housing adapted to aright itself and to which is rotatably connected an elongated arm having connected at a distal end a toy character adapted to orbit about the perimeter of the housing.

2. Description of the Prior Developments

It would seem that the typical pet owners are forever in search of a toy device that will amuse and exercise their pets independent of the cooperation of the pet owners. Well known devices which have been used to this end include artificial mice, rubber balls, plastic balls, balls having bells in their center, bags or artificial mice stuffed with catnip.

Artificial mice and balls of all shapes and sizes have traditionally appealed most to pets and particularly to cats. One reason for the success of these devices can clearly be attributed to the natural instinct of cats to chase and pounce on prey.

A problem with these devices however is that while they are easily propelled, they either do not sustain motion or are easily lost. For example, the artificial mice which is initially appealing to the cat does not move without the continuous influence of the pet. In the case of the ball, although it will maintain its motion without the constant influence of the pet, its generally small dimensions often result in the ball rolling under a piece of household furniture or in between furniture out of the reach of the playing pet. Thus such devices while initially effective in entertaining and exercising a cat without the need for human cooperation typically fail to sustain the interest of the pet for either of the enumerated reasons.

A need therefore continues to exist for a pet toy particularly adapted for use by a pet which does not require actuation by or the cooperation of the pet owner. A further need exists for such a toy which may be easily set in motion by the pet and which can sustain its motion without repeated actuation by the pet. A still further need exists for such a toy which while maintaining its motion will not be easily lost or placed out of reach by the aggressive play of a pet yet produces a complex orbiting movement that will maintain the pet's interest.

SUMMARY OF THE INVENTION

The present invention has been developed to overcome the problems and fulfill the needs noted above as well as to provide additional benefits discussed in detail hereinbelow.

It is an object of this invention to provide a pet amusement and exercise device that can be easily played with by a pet particularly a cat without the need for human manipulation.

It is another object of this invention to provide a device that is substantially fixed in an area obviating the likelihood that the device will be lost or placed out of reach by the play of an aggressive pet.

It is still another object of this invention to provide a pet amusement and exercise device that although substantially fixed produces complex orbiting and rocking movements that are stimulating and enticing to the pet.

It is yet another object to provide a pet amusement and exercise device that is self-arighting.

It is still another object of the invention to provide a pet toy particularly adapted for use by a cat, which includes a generally fixed housing which is self-arighting and which includes a freely orbiting toy character or object.

These and other objects are met by the present invention which includes a generally fixed housing having rotatably connected thereto a toy object secured by a horizontally oriented rigid arm. The housing is generally comprised of a base or a support to which is mounted a canopy, the base being adapted for seating the device flatly on a supporting surface such as a floor. The arm is pivotally connected between the base and canopy and rotates freely about the pivot shaft within an annular space or channel located between the base and canopy. At an outermost end of the arm is mounted a toy character or object such as a mouse.

When the toy device is seated on the floor the toy character is locked in a fixed orbit about the perimeter of housing. The orbital motion is greatly enhanced by the provision of a ball bearing means for fluid and virtually friction free rotation of the rigid arm about the pivot shaft. In this manner even the slightest nudge, will set the character in motion about the housing.

The aforementioned objects features and advantages of the invention will, in part be pointed out with particularity, and will, in part become obvious from the following more detailed description of the invention, taken in conjunction with the accompanying drawings, which form an integral part thereof.

BRIEF DESCRIPTION OF THE DRAWINGS

In the drawings.

In the various figures of the drawings, like reference characters designate like parts.

DETAILED DESCRIPTION OF THE PREFERRED EMBODIMENT

Figure 1:
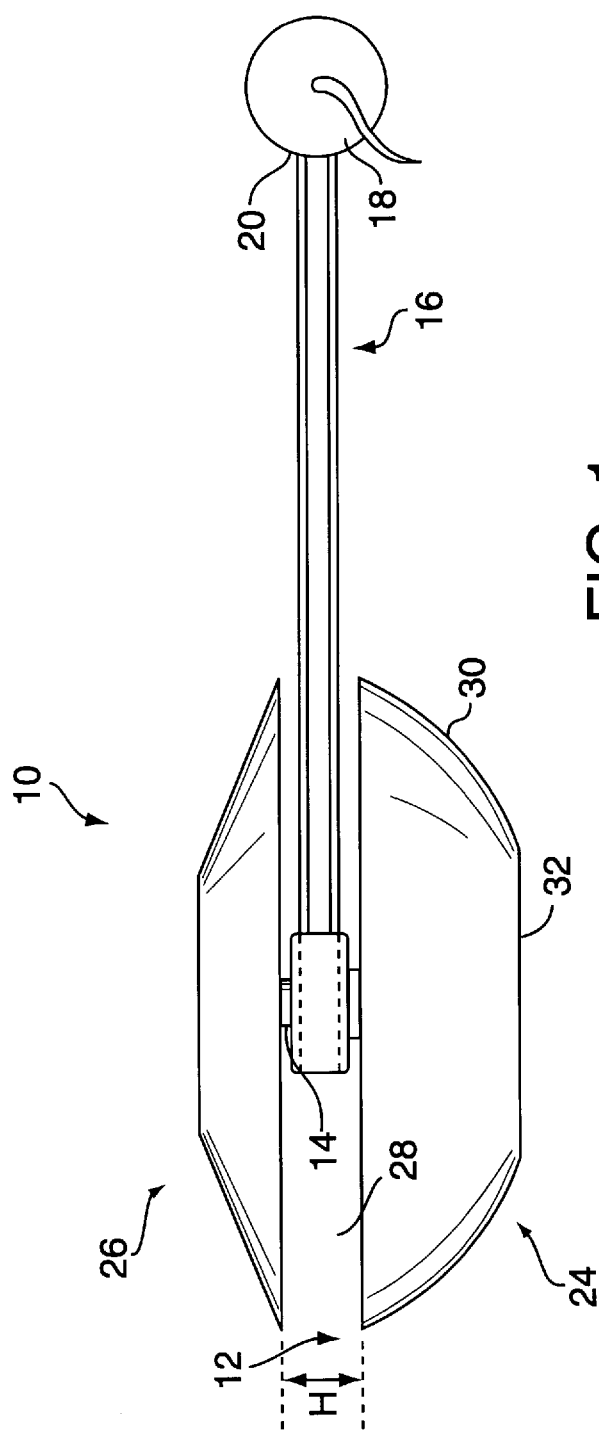
FIG. 1 is a perspective view of the present invention at rest on a flat surface.

According to a preferred embodiment of the present invention, the drawings illustrate a toy device 10 which is intended for the amusement and exercise of a pet and in particular a cat. The toy device generally comprises a housing 12 adapted to be assembled and disassembled having a pivot shaft 14 positioned within a perimeter of the housing 12.

An elongated rigid arm 16 is pivotally cantilevered from the pivot shaft 14 for rotation of the arm 16 about the shaft 14. To induce a pet to rotatably drive the rigid arm 16, an artificial toy character 18, such as a stuffed bird or mouse, is permanently secured by gluing, stapling, or other conventional fastening means to a distal end 20 which is preferably just beyond the perimeter of the housing 12.

The housing 12 and arm 16 are preferably made of a resilient, non-destructive, lightweight plastic material. In this manner, the toy device can be played with aggressively without threat of injury to the pet or damage to the toy device or the personal property of the pet owner.

Figure 2:
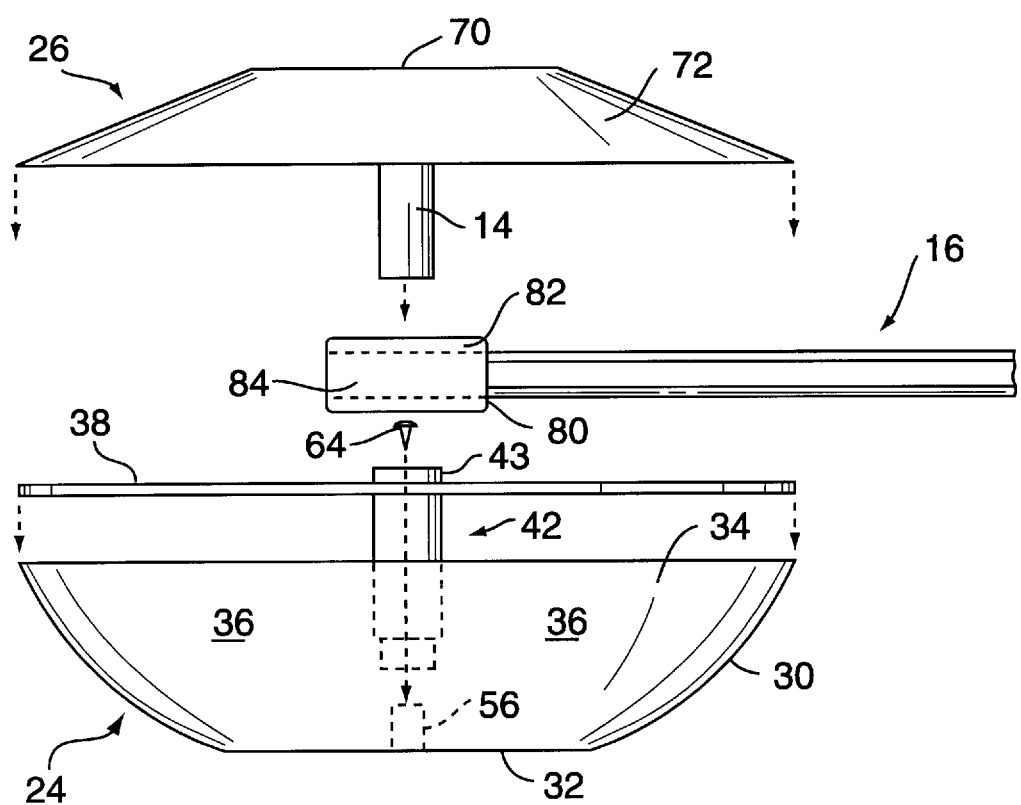
FIG. 2 is an exploded view of the toy of FIG. 1.
Figure 3:
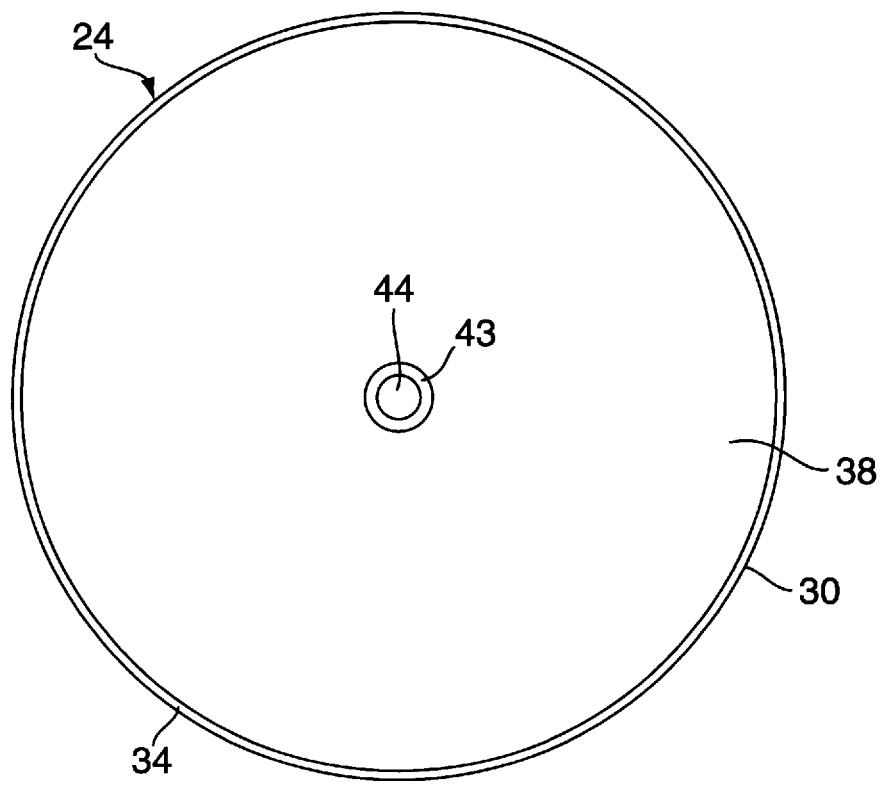
FIG. 3 is a top elevation view of a portion of the toy of FIG. 1.
Figure 4:
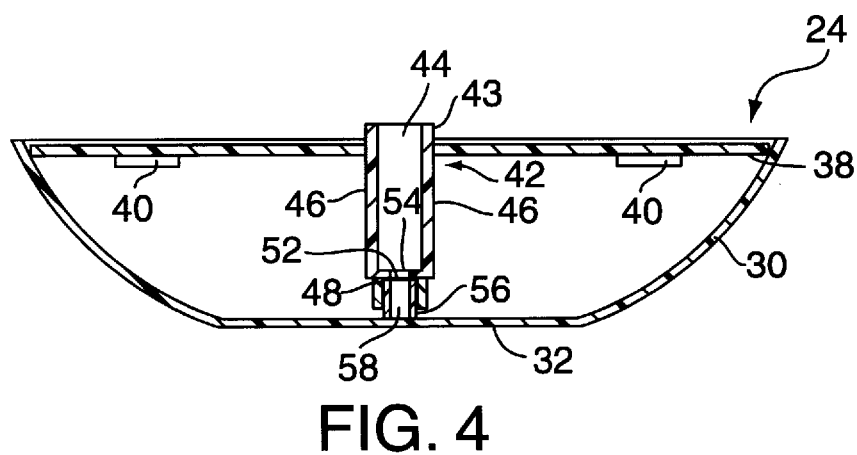
FIG. 4 is a view in section of the base of FIG. 2.
Figure 5:
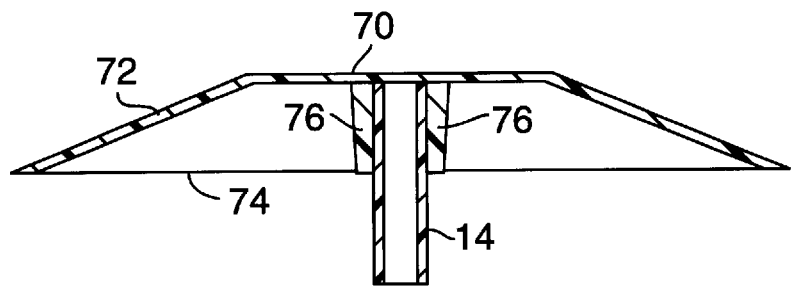
FIG. 5 is a view in section of the canopy of FIG. 2.

Details of the toy device 10 are illustrated in FIGS. 2, 4, and 5 wherein the housing 12 is shown as comprising a substantially hollow base member 24 to which is removably superposed a canopy member 26 by means of the pivot shaft 14 such that in the assembled housing 12 the pivot shaft extends vertically between the diametrical center of the canopy 26 and the diametrical center of the base 24.

As shown in FIG. 1, the assembled housing has an annular channel 28 which extends across the housing 12 and which is concentric with the pivot shaft 14. The channel 28 has a height H as measured between the canopy 26 and the base 24. In this manner, the pivotally cantilevered arm 16 may extend radially outward through the channel 28 to a point beyond the perimeter of the base 24 and canopy 26 where the character 18 may orbit the housing without impediment.

As shown in FIGS. 1 through 4, the base is a substantially hemispherical member comprising a substantially curved sidewall 30 extending upwardly from a generally flat circular end wall 32. The base further includes a circular base cover 38 which is removably disposed within the open mouth 34 of the base 24 and serves to close off the substantially hollow interior 36 of the base 24. Although the base 24 is shown as substantially hollow, the base 24 may be filled with a suitable ballast material to weight the toy device such as to provide a more stable foundation about which the arm 16 and character 18 may orbit.

As shown further in FIG. 4, a plurality of circumferentially spaced ledges 40 may be provided along an inner wall of the base and adjacent the mouth 34 for evenly supporting the cover 38 within the mouth 34.

The configuration of the base 24 as described has as a benefit the provision of a stable foundation for the toy device 10 when seated on a substantially flat surface such as the floor. Additionally, in the event the seated toy device 10 is tipped during play, the sidewall is adapted to produce a rocking and teetering motion which automatically arights the device 10. In this manner, even the most aggressive pets are not able to capsize the device 10.

Although not shown in the drawings, it should be appreciated that the base 24 may be made perfectly hemispherical by curving the end wall 32 thereby enhancing the complex rocking motion of the device 10 and further stimulating the engaged pet.

The base further includes a cylindrical sleeve 42 which is integrally joined to the cover. The sleeve 42 extends axially through the center of the cover and into the interior 36 of the base 24 terminating adjacent the end wall 32. Through the center of the sleeve 42 is provided an annular bore 44 which extends the full length of the sleeve 42 and which is dimensioned to provide a secure, non-rotating fixed mounting for the pivot shaft 14. As shown in FIG. 4, the greatest portion of the sleeve 42 resides below the base cover with only a leading edge 43 of the sleeve 42 extending axially above the cover within the annular channel 28.

Below the base cover 38, the sleeve 42 further comprises upper and lower tubular sections 46,48 with the diameter of the lower section 48 being stepped down from that of the upper section 46. At the level of the junction of the upper and lower sections 46,48 the axial bore 44 may be intersected by a transverse wall 52 having a centrally disposed aperture 54.

As further shown in FIG. 4, a peg 56 having a central bore 58 is provided which projects upwardly from the center of the end wall 32. When the base cover is seated in the mouth 34 of the base 24, the peg 56 is received within the lower section 48 such that the top of the peg 56 abuts the transverse wall 52. In this manner the peg 56 may be secured to the transverse wall 52 by a screw 64 which is driven through the aperture 54 into bore 58 thus securing the cover 38 to the base 24.

Although the base 24 has been shown as comprising a removable base cover 38, it should be appreciated that the base cover 38 may be permanently secured as by heat welding or other suitable means or alternatively the base may be molded with the base cover 38 or its equivalent already in place.

As shown in FIGS. 1, 2, and 5, the canopy 26 which is to be mounted to the base is generally configured to have the shape of an inverted saucer. The canopy comprises a circular top wall 70 connected to a radially expanding sidewall 72 which has a diameter greater than the top wall and which at the outer edge 74 has a diameter substantially equivalent to the diameter of the mouth 34 of the base 24.

The canopy 26 as shown in FIGS. 1, 2 and 5 is dimensioned and shaped in a substantially similar manner as the base 30. It should be noted from these Figures that if the device 10 was indeed inverted either by accident or by the activities of an extremely aggressive pet, the device would be operational in the inverted position. This is because the toy character 18 is dimensionally smaller than the clearance as measured from the arm 16 and the top wall 70 of the canopy.

As shown in FIG. 5, the pivot shaft 14 depends substantially vertically from the center of the top wall 70 and is preferably integrally joined thereto. The pivot shaft 14 may include a plurality of radially projecting struts 76 which extend axially from the top wall 70 along an outer perimeter of the cylindrical pivot shaft 14. Each strut 76 is circumferentially spaced along the perimeter of the shaft and is preferably of equal height.

In order to pivotally connect the arm 16 to the pivot shaft, the arm 16 includes at a proximate end 80 a circular mounting coupler 82 into which is press fit a ball bearing means 84. The ball bearing means 84 is of a conventional type comprising inner and outer concentric metal races 86,88 in between which is located an annular raceway 90. A number of spaced lubricated steel ball bearings 92 are captured within the raceway by the provision of a light metal cage 94.

Figure 6:
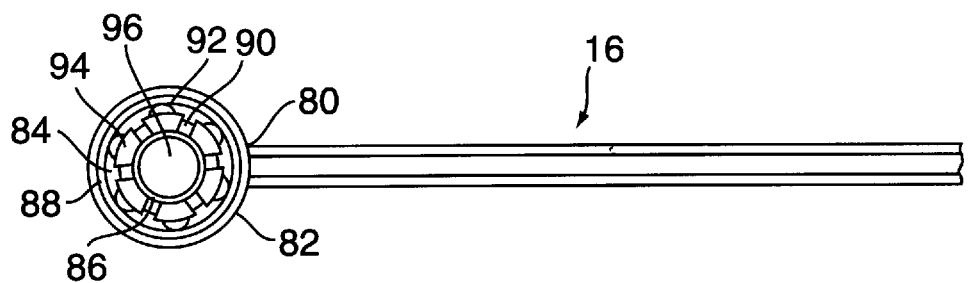
FIG. 6 is a top elevation view a portion of the toy of FIG. 1.

As seen in FIG. 6, the inner race 86 has a central lumen 96 which is dimensioned to have a diameter which is substantially equal to the diameter of the pivot shaft 14. In this manner the inner race 86 is non-rotatably fixed to the shaft 14.

The housing is assembled by mounting the coupler 82 to the shaft 14 and thereafter driving the shaft 14 into the axial bore 44 such that a portion of the shaft will extend within section 46 of the sleeve 42. The provision of the struts 76 and the leading edge 43 of the sleeve 42 limit the axial freedom of the collar 82 and in particular the inner race 86 about the pivot shaft 14.

In this manner, the struts 76 and leading edge 43 act to center the arm within the height H so that the arm 16 may freely rotate about the vertical axis of rotation which extends through the center of the pivot shaft 14 without interference from the canopy 26 or the base 24.

In use, a pet may swat or simply brush against the toy character 18 causing the elongated arm 16 to freely glide about the pivot shaft 14 and initiating the orbital movement of the character about the perimeter of housing 10. The more rigorous the contact with the character 18, the greater its displacement and deflection. Once activated the member will maintain its movement for some time giving the pet the perception that the toy is moving independently. This increases the pet's interest and encourages the pet to continue in its play.

Although the preferred embodiment has been shown herein as comprising a housing and elongated arm which are adapted to be assembled and disassembled, it should be appreciated that such modularity is for convenience of shipping and storage and may be modified such that the housing and/or the arm may not be assembled and disassembled.

There has been disclosed heretofore the best embodiment of the invention presently contemplated. However, it is to be understood that various changes and modifications may be made thereto without departing from the spirit of the invention.

What is claimed is:

1. A toy device, comprising:
    a base having a substantially hemispheric configuration;
    a canopy;
    a pivot shaft disposed vertically between a center of said base and a center of said canopy;
    an elongated arm rotatably connected to said pivot shaft and extending radially outward from and substantially perpendicular to said pivot shaft; and
    a toy character rigidly attached to a distal end of said elongated arm for inducing a pet to rotatably drive said elongated arm and said toy character about said pivot shaft.

2. The device of claim 1 wherein said toy character rotates in a fixed radial orbit beyond the perimeter of said base and said canopy.

3. The device of claim 1 wherein said arm rotates about said pivot shaft between said canopy and said base.

4. The device of claim 1 wherein said elongated arm further comprises at a proximate end a collar for mounting said arm to said pivot shaft.

5. The device of claim 4 wherein a ball bearing means is housed within said collar for enhancing the rotation of said arm about said pivot shaft.

6. The device of claim 1, wherein said canopy has a frustoconical configuration.

7. A pet toy comprising:
    a base having a hemispheric configuration;
    a canopy;
    a pivot shaft joining said canopy and said base and extending therebetween;
    an arm rotatably connected to said pivot shaft and extending radially out from said pivot shaft; and
    a toy object rigidly attached to said arm to induce a pet to rotatably drive said arm and said object about said pivot shaft.

8. The device of claim 7 wherein said canopy is removably mounted to said base.

9. The device of claim 8 wherein said pivot shaft is an extension of said canopy.

10. The device of claim 7 wherein said arm extends radially between said base and said canopy.

11. The device of claim 10 wherein said pivot shaft further comprises a plurality of radially extending struts spaced about the perimeter of said pivot shaft for centering said arm between said canopy and said base.

12. The device of claim 11 wherein said base further comprises a base cover for closing of a said substantially hollow base.

13. The device of claim 7 wherein said base is substantially hollow and further comprises a generally flat end wall and curved sidewall.

14. The device of claim 13 wherein a portion of said pivot shaft extends through a base cover into said hollow base for joining said canopy to said base.

15. The device of claim 7, wherein said canopy has a frustoconical configuration.

16. A pet toy comprising:
    a hollow base having a hemispheric configuration;
    a canopy;
    a pivot shaft joining said canopy to said base and extending therebetween;
    an arm rotatably connected to said pivot shaft and extending radially outward between said canopy and said base; and
    a toy object rigidly attached to said arm to induce a pet to rotatably drive said arm and said object about said pivot shaft.

17. The device of claim 16 wherein said hollow base further comprises a base cover for closing off said hollow base.

18. The device of claim 17 wherein said base cover further comprises a hollow sleeve into which is inserted said pivot shaft for joining said canopy to said base.

19. The device of claim 16 wherein said arm further comprises a collar for connecting said arm to said shaft.

20. The device of claim 19 wherein said collar further comprises a ball bearing means for enhancing the rotation of said arm about said pivot shaft.

21. The device of claim 16, wherein said canopy has a frustoconical configuration.

* * * * *